Feb. 5, 1946. E. M. SCHARENBERG 2,394,492
BUILDING FORM
Filed June 24, 1941
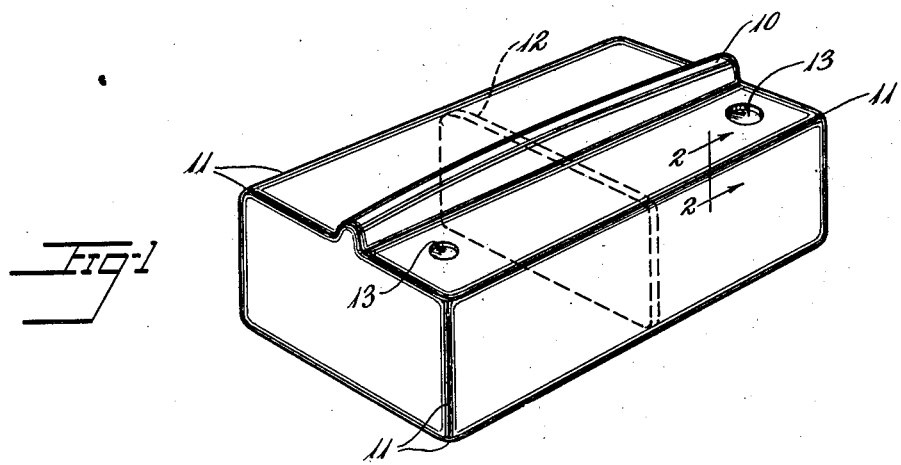
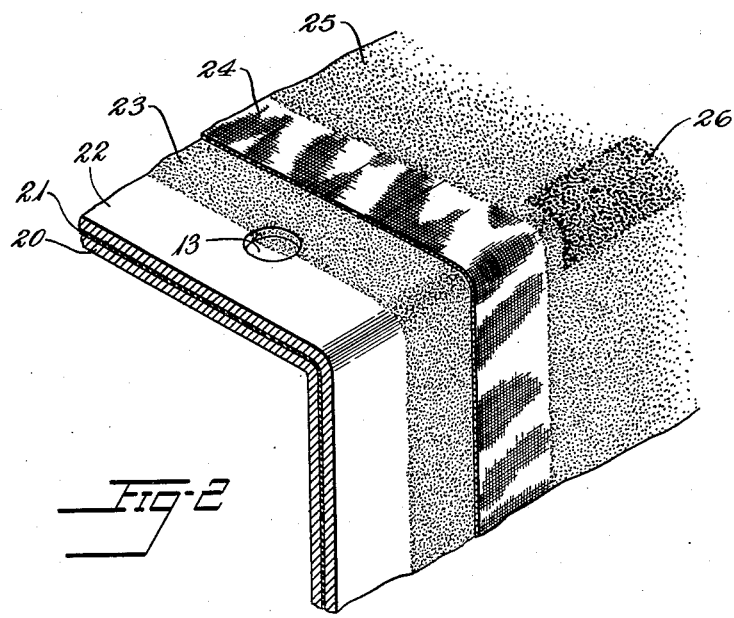
Inventor
Elmer M. Scharenberg
By Willis F. Avery
Atty.

Patented Feb. 5, 1946

2,394,492

UNITED STATES PATENT OFFICE 2,394,492

BUILDING FORM

Elmer M. Scharenberg, Akron, Ohio, assignor to
The B. F. Goodrich Company, New York, N. Y.,
a corporation of New York Application June 24, 1941, Serial No. 399,481

5 Claims. (Cl. 18—45)

This invention relates to a new kind of building-form for the construction of tanks or other hollow articles built up from laminations of flexible or resilient material; it has as its chief object to provide lightweight and strong building forms which are adapted to be produced with accurate dimensions on a mass-production scale, and which are easily removable from the tank through a small opening after completion of the tank.

Forms for the construction of hollow articles have been made from sheets of metal which can be collapsed or coiled up in order to facilitate their removal from the finished article through a small handhole. It has been found, however, that this type of form is best adapted to cylindrical tanks where a more or less uniformly rounded surface is desired. In the case of self-sealing gasoline tanks, especially those used in airplanes where all available space must be utilized, very irregular shapes, designed to fit around structural members and projections such as are found in wing-sections, are often required. Obviously, coilable metal forms are ill-adapted for this type of construction.

The use of metal forms which are hinged or otherwise adapted to be collapsed after use involves expensive and complicated equipment which is difficult to keep in good condition. Forms constructed from members which are readily destructible, such as cardboard or strawboard members, because of the complicated method of their construction are likely to have errors in the dimensions or the location of fittings in the finished tank or other article.

The building-form employed in the manufacture of hollow laminated articles must not only be easily removable through a relatively small opening in the finished article, but must also be sturdy enough to permit the application of layers of rubber-like material to its surface and the rolling of each of these to ensure its adhesion to the layer below it. In addition, it is desirable that the form be light enough in construction to permit easy manipulation of it by the workers engaged in building up the laminated article on its surface. Since the finished article is cured, that is, the rubber portions are vulcanized by heating before removal of the form, the latter must be able to withstand temperatures up to 300°. Moreover, the form must provide a surface with sufficient building tack so that the innermost layer of rubber-like material may be applied without any wrinkles or trapped air between it and the form. Failure to provide a smooth and even inner layer leads to the formation of blisters between the layers and to the separation of the plies during cure with subsequent weakening of the structure. After completion of the cure the adhesion between the form and the article must be such that the form can be cleanly removed, leaving no scraps adhered to the inner surface of the article.

I have invented a building form which possesses all these desirable characteristics. In its preferred form it is a hollow shell molded from plaster of Paris or some similar stiffening material, with one or more layers of papier-mâché. Glue or other similar material may be used as a binder in the papier-mâché layer. Since the mold from which the form is cast may be used repeatedly, production on a large scale with a high degree of accuracy and exact duplication of dimensions is easily attained.

One modification of my invention is shown in the attached drawing, in which Fig. 1 is a view in perspective of a building form used for the construction of self-sealing gasoline tanks, and Fig. 2 is a detailed view of the construction of the form taken along line 2—2 of Fig. 1.

In Fig. 1, a projection or rib 10 on the form is shown as typical of the irregular shapes which may be required. The corners and edges of the form may be either angular or rounded off as shown at 11. If the form has any large flat surfaces, it is usually desirable to support them by a partition 12. The partition may be constructed from strawboard, boxboard, millboard, cardboard, or any other strong, light, and easily destructible material and may be fastened in place conveniently with adhesive tape. Depressions or insets 13 may be molded directly into the surface of the form to facilitate accurate positioning of fittings to which the inlet, outlet, or vent pipes are attached. Accurate positioning of these members is very important, especially when the tanks are constructed at a location far removed from the point at which they are to be fitted into their supporting structure or framework.

In Fig. 2 the inner layer 20 of the form is papier-mâché; the intermediate layer 21 is plaster of Paris, clay, or some similar material; and the outer layer 22 is papier-mâché; a total wall thickness of ¼" to ⅜" is satisfactory for most purposes, although a somewhat thicker or thinner wall may be used. In order to insure complete removal of the form from the finished article, it is desirable to provide a surface on the building form of a somewhat higher tear-resistance than papier-mâché. I have found that a fabric, such as thin cotton sheeting, or a sheet of synthetic material such as a cellulose ester or ether, or a fabric woven from synthetic fibers, is satisfactory. The fabric layer 24 should be firmly adhered to the surface of the form by means of a suitable glue, paste, or cement 23. I have found that ordinary rubber cement is satisfactory. In order to supply building tack, that is, sufficient adhesiveness to permit laying a smooth, close-fitting inner ply on the surface of the cloth, it is desirable to coat the external surface of the cloth with non-curing rubber latex 25, which, when dry, provides sufficient tack for that purpose but which does not set up or cure into the tank itself so that the fabric cannot be easily removed from the finished article. In addition to this adhesive it is usually desirable to provide an additional layer of stronger adhesive 26 at the corners and edges. This adhesive may be composed of the same material as the inner layer of the tank, and so form a part of it after cure. For example, if the lining of the tank is composed of oil-resistant synthetic rubber, a cement made by dissolving the same material in a suitable solvent may be used on the corners and edges.

The usual methods of preparing molded papier-mâché articles may be employed in constructing my new building form. A master form may be constructed of wood or cardboard from the blueprints. A mold may then be prepared from the master form using plaster of Paris or other molding compound; this mold is in turn used for the production of the building forms for the tanks themselves by applying to its inner surface a wet sheet of paper-mâché followed by a layer of plaster of Paris, and a second sheet of papier-mâché. The papier-mâché sheets may be applied in one piece, or may be applied as a plurality of thinner sheets. In the case of completely enclosed articles, the forms for which are molded in two separate halves, the parts of the form may be joined together by extending the outer papier-mâché layer over the seam. It is usually desirable to dry the form at an elevated temperature.

In practice I have used my new building form in the construction of self-sealing gasoline tanks, such as are employed in airplanes. The fittings for the inlet and outlet tubes, vents, etc., are placed in the holes which have been molded into the form, and the various laminations are built up around them, each layer being cut to fit and carefully rolled in place to insure good adhesion between the layers and removal of all air bubbles. After the desired construction has been completed, the whole tank, while still on the building form, is wrapped tightly with wet cloth tape and cured in air at a temperature of 250° to 300° F. The wrapping with cloth tape is desirable to prevent formation of blisters and separation of plies during the cure.

After the cure is complete and the article is cool, the building form may be removed through the small opening provided for that purpose by first deforming the article sufficiently to crack the form, and then removing the latter piece by piece. If desired, the form may first be softened by applying water. By careful removal of the fabric or other sheeting which covered the form, complete removal of the papier-mâché is assured.

The use of my building-form is not limited to articles substantially completely enclosed but may also extend to open-faced articles although the advantages of my invention are more apparent in the former case. Obviously, the advantages of accurate positioning of the fixtures and accurate duplication of the form are equally applicable to building forms for open-faced articles.

Although I have herein disclosed specific embodiments of my invention, I do not intend to limit myself solely thereto but only as indicated by the appended claims.

I claim:

1. A building form for the production of hollow articles from sheets of rubber-like material comprising a hollow molded readily destructible form of fibrous material and a stiffening material, a fabric sheet adhered to the external surface thereof, and a layer of non-curing adhesive on the external surface of the fabric.

2. A building form for the production of hollow articles from sheets of rubber-like material comprising a hollow molded readily destructible rigid form of fibrous material and a stiffening material, covered with a layer of non-curing adhesive.

3. A building form for the production of hollow articles from sheets of rubber-like material comprising a hollow molded readily destructible form of fibrous material and stiffening material, a fabric sheet adhered to the external surface thereof, a layer of non-curing adhesive on the external surface of the fabric, and an additional layer of curing adhesive on the corners and edges of the fabric-covered form.

4. A building form for the production of substantially completely enclosed hollow articles from sheets of rubber-like material comprising a hollow molded readily destructible form of fibrous material and stiffening material, a fabric sheet adhered to the external surface thereof, and a layer of non-curing adhesive on the external surface of the fabric.

5. A building form for the production of substantially completely enclosed hollow articles from sheets of rubber-like material comprising a hollow molded readily destructible form comprising an outer layer of papier-mâché, an intermediate layer of plaster, and an inner layer of papier-mâché; a fabric sheet adhered to the outer layer of papier-mâché, and a layer of non-curing adhesive on the external surface of the fabric.

ELMER M. SCHARENBERG.